United States Patent [19]

Renk

[11] Patent Number: 4,693,628
[45] Date of Patent: Sep. 15, 1987

[54] BALL JOINT, ESPECIALLY FOR MOTOR VEHICLES

[75] Inventor: Rolf Renk, Ginsheim, Fed. Rep. of Germany

[73] Assignee: General Motors Corporation, Detroit, Mich.

[21] Appl. No.: 848,577

[22] Filed: Apr. 7, 1986

[30] Foreign Application Priority Data

Apr. 27, 1985 [DE] Fed. Rep. of Germany ....... 3515303

[51] Int. Cl.⁴ .............................................. F16D 1/12
[52] U.S. Cl. .................................. 403/135; 403/144
[58] Field of Search ................................ 403/135–141, 403/144, 145, 133, 122, 322, 321, 327; 220/233, 234

[56] References Cited

U.S. PATENT DOCUMENTS

| | | | |
|---|---|---|---|
| 2,487,635 | 11/1949 | Carpenter | 220/233 |
| 3,131,825 | 5/1964 | Sarafinas | 220/234 |
| 4,017,197 | 4/1977 | Farrant | 403/132 |
| 4,063,834 | 12/1977 | Hanson et al. | 403/138 |
| 4,163,617 | 8/1979 | Nemoto | 403/144 |
| 4,386,949 | 6/1983 | Bassi | 403/141 |
| 4,410,295 | 10/1983 | Ersoy et al. | 403/135 |
| 4,520,546 | 6/1985 | Darnell | 403/327 |
| 4,615,638 | 10/1986 | Ho | 403/135 |

FOREIGN PATENT DOCUMENTS

| | | |
|---|---|---|
| 1974987 | 12/1967 | Fed. Rep. of Germany . |
| 6605346 | 5/1970 | Fed. Rep. of Germany . |
| 2441916 | 3/1976 | Fed. Rep. of Germany ...... 403/144 |

Primary Examiner—Cornelius J. Husar
Assistant Examiner—Peter M. Cuomo
Attorney, Agent, or Firm—William A. Schuetz

[57] ABSTRACT

A ball joint comprised of a ball with a shank, a socket having slots on the open side thereof, a steel ring with a lever for accommodating the ball joint, and a clamping mechanism which is fitted as a one-piece unit to the socket, said clamping unit being adapted to also effect clamping of the upper portion of the socket and to afford force and form-locking stabilization thereof. The clamping unit for effecting biasing in axial direction of the socket with the steel ring forming the housing of the ball joint is in the form of a knee-lever mechanism. This mechanism includes hook-like members which are arranged on the socket, said hook-like members being linked with a centrally disposed and axially displaceable thrust member. The thrust member serves as a manipulating means for actuating the knee-lever mechanism.

6 Claims, 9 Drawing Figures

BALL JOINT, ESPECIALLY FOR MOTOR VEHICLES

The invention relates to a ball joint, especially a ball joint for motor vehicles, which is comprised of a ball with a shank, a socket having slots on the open side thereof, a steel ring with a lever for accommodating the ball joint and a clamping mechanism which is fitted as a one-piece unit to the socket. Another component of the invention is a fixture for assembling the ball joint.

In the German utility patent DE-GM 66 05 346 a ball joint for suspending and articulating motor vehicle wheels has been proposed in which a spherical pivot pin is mounted for universal movement in a socket. In this arrangement, the side of the ball joint housing disposed oppositely the opening provided for insertion of the spherical pivot pin is closed by a cover which bears against the upper edge of the socket. Automatic adjustment of the pivot elements is effected by a spring member. The reason for the automatic adjustment provision in this arrangement is that compensation must be made for the play that develops on account of wear between the spherical head and the socket. The spring member for furnishing the necessary adjustment force is bearing against the spherical head and is in the form of a disk which extends towards the spherical head and which forms a one-piece member with the wall of the socket. The disadvantage of this arrangement is that the pressure exerted by the disk generates friction between the spherical head and the socket and that, as a result, the operation and service life of the ball joint are adversely affected.

It is the object of the invention to improve this prior art arrangement and to provide a ball joint of the type described above which operates smoothly and which has a relatively long service life. This objective is accomplished in that the clamping unit for axially biasing the socket with the steel ring is in the form of a knee-lever mechanism.

The clamping mechanism also biases the upper portion of the socket and thus serves as a second abutment means so as to provide force and form-locking stabilization of the socket. Due to the axial biasing of the socket, there is no axial play in the ball joint and no pressure is exerted onto the spherical member of the ball joint, so that the wear on the ball and socket surfaces that are in frictional engagement with one another is reduced to a minimum. The arrangement proposed by the invention also simplifies the assembly procedures, and the required assembling tools are relatively simple and inexpensive, so that assembly costs are relatively low. The procedure of fixing the socket into its axial position does not require the use of additional components, and disassembly of the ball joint is also very simple, so that repair work can be carried out with ease and facility. The dimensions of the clamping unit and the forces generated by the same can be easily adapted to the specific requirements that must be met.

In accordance with an additional feature of the invention, the clamping mechanism may be provided with hook-like members which are arranged on the socket. Said hook-like members are connected by way of braces with a centrally disposed and axially displaceable thrust member. The connections may be in the form of hinge-like joints.

Other features and advantages will become apparent from the sub-claims as well as the drawings and specifications. The drawings illustrate exemplary embodiments of the invention.

Figure 1:
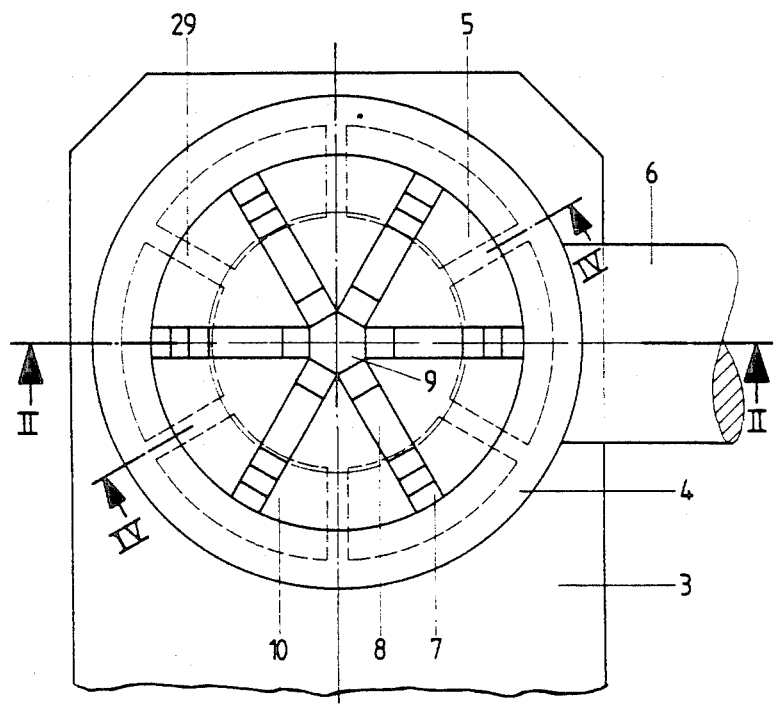
FIG. 1 is a plan view of the ball joint with the clamping mechanism.
Figure 2:
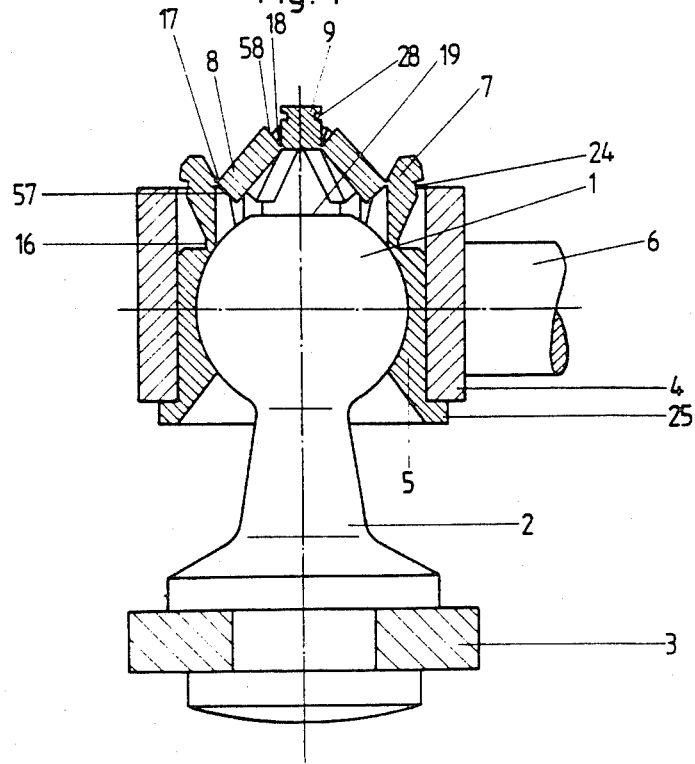
FIG. 2 is a section along line II—II of FIG. 1.
Figure 3:
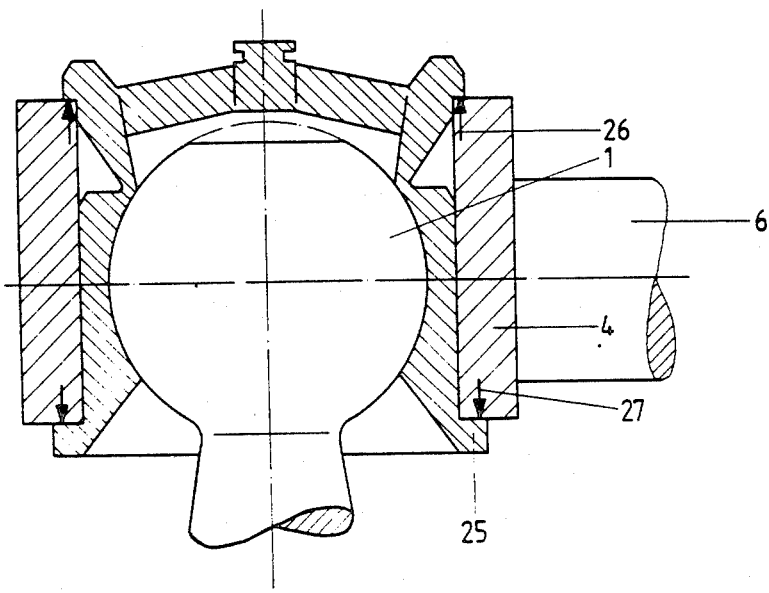
FIG. 3 is a section along line II—II of FIG. 1 with the clamping mechanism being in the clamped state.

The ball joint according to FIGS. 1 to 4 is comprised of the ball 1 with shank 2, the lever 3 fitted to the shank 2 and the socket 5 inserted into the steel ring 4. The steel ring 4 is provided with a lever 6 and forms the housing for accommodating the ball joint. Shank 2 may be fitted to the lever 3 by riveting, threaded connection or welding, and the same techniques may be used for interconnecting the steel ring 4 and lever 6. Preferably, the socket is made of a plastic material and has formed on its upper end by injection molding flexible, hook-like members 7 which are articulated through bracing members 8 to an axially displaceable thrust member 9. To protect the ball joint against dirt and moisture, a protective skin 10 may be interposed between the bracing members 8. The hook-like members 7, the bracing members 8 and the thrust member 9 form a clamping unit and in combination act in the manner of a knee-lever mechanism (FIG. 7) through the hinge-like joints 16, 17 and 18 which establish the connection between the socket 5 and hooks 7, hooks 7 and bracing members 8, as well as bracing members 8 and thrust member 9. The joints 16, 17 and 18 are dimensioned in a manner to enable the clamping action to proceed with a minimum of force. Socket 5 and clamping mechanism 7, 8, 9 form a one-piece unit which can be mass-produced at low cost by the injection molding technique. The ball 1 is provided in the region of the clamping mechanism with a flattened surface 19 to render possible a relatively large angular deflection for the shank 2. The hook-like members 7 are provided with recesses 24 which, in combination with the projecting collar 25 at the lower edge of the socket 5, form the abutments on the steel ring 4 when the ball joint is in the biased state, as indicated in FIG. 3 by arrows 26 and 27. To facilitate disassembly, the thrust member 9 may be provided with a groove 28 for insertion of a tool, so that the thrust member 9 can be raised up which will cause unlocking of the hook-like members 7. As apparent from FIG. 4, the socket 5 is provided with slots 29 which enables drawing of the mold core and insertion of the ball 1 into the socket.

Figure 5:
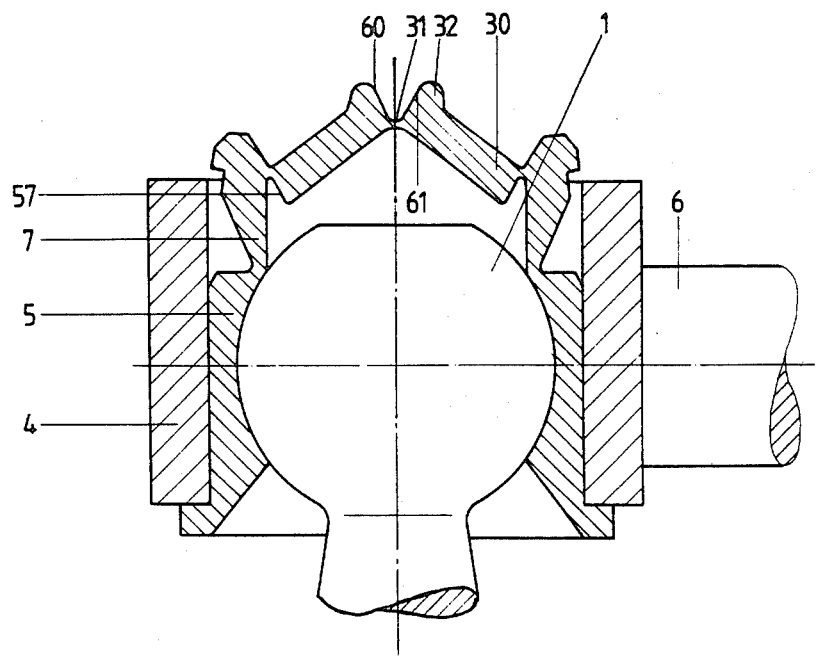
FIG. 5 is a sectional view of a modified embodiment of the ball joint.

FIG. 5 illustrates another embodiment which does not require the use of the thrust member 9. In this arrangement, the braces 30 are interconnected through a common joint 31. The braces 30 are provided with hump-like protrusions 32 by which the clamping mechanism can be manipulated.

As best shown in FIGS. 1, 3, 6 and 7, the clamping unit or bracing and clamping mechanism comprises a plurality of annularly spaced hook-like members 7 which are integrally connected at their lower ends to the adjacently located main portion of the socket 5 via an integrally formed hinge joint or hinge, as indicated by reference numeral 16, for pivotal movement about a first pivot axes extending tangentially of the spherical surface of the ball 1. The clamping unit further comprises a plurality of radially spaced braces 8, each of which is radially aligned with an adjacently located hook-like member 7 and which extend radially of the vertical pivot axis of the ball stud 1, as viewed in FIGS. 1 and 6. The braces 8 are integrally connected at their outer ends to the adjacently located member 7, intermediate the ends of the latter, via an integrally formed hinge joint or hinge, as indicated by reference numeral 17, for pivotal movement about a second pivot axes extending parallel or substantially parallel to the first pivot axis of the adjacently located hinge 16. In addition, the clamping unit includes a central thrust member 9 which is integrally connected to the inner end of each of the brace members 8 via integrally formed hinge joints or hinges, as indicated by reference numeral 18, for pivotal movement about third axes extending parallel to the second pivot axes.

In the FIG. 5 embodiment, the upper or inner ends of the braces 30 are integrally connected via an integrally formed hinge joint or hinge means 31 for pivotal movement about third axes or points parallel to the second axes pivotally connecting the outer ends of the braces to the hook-like members 7.

Figure 6:
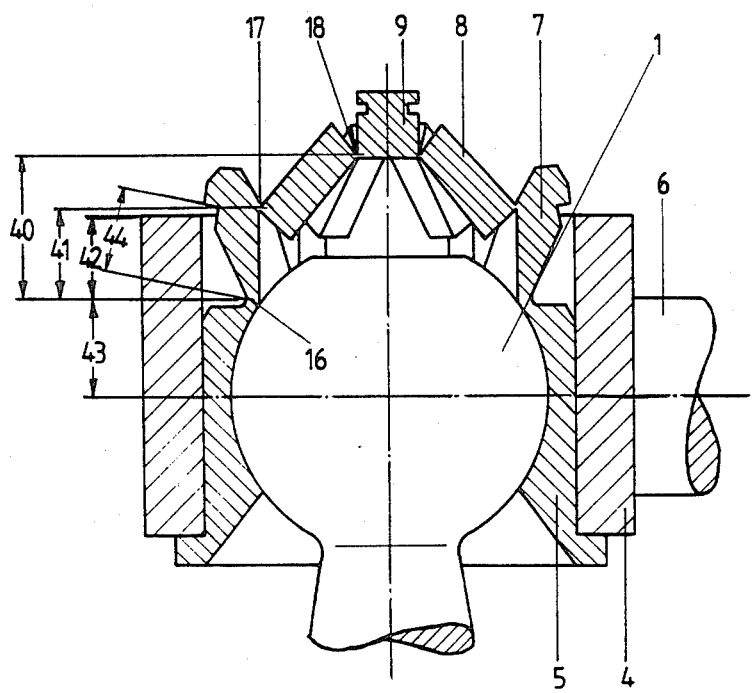
FIG. 6 is the sectional view according to FIG. 2 which indicates the possibilities for selecting the dimensions for the various force transmitting requirements.

The clamping unit or mechanism is adapted to be moved between an unclamped position, as shown in FIGS. 2 or 6, and a clamped position, as shown in FIG. 3. The FIG. 5 embodiment is shown only in the unclamped position. In the unclamped position the third pivot axes for the hinges 18 connecting the thrust member 9 to the brace members 8 is located or spaced further from the flat end 19 of the ball stud 1 than the second pivot axes for the hinges 17 connecting the brace members 8 to the hook-like members 7. In this position the metal or steel ring 4 and ball stud 1 can be assembled and disassembled to and from the socket 5. The unclamped position is also schematically shown in FIG. 7 and designated by the Roman numeral I, the schematic links representing the brace members 8, the outer pivots representing the hinges 17 and the center pivot the hinges 18 (shown schematically as a single pivot).

Figure 4:
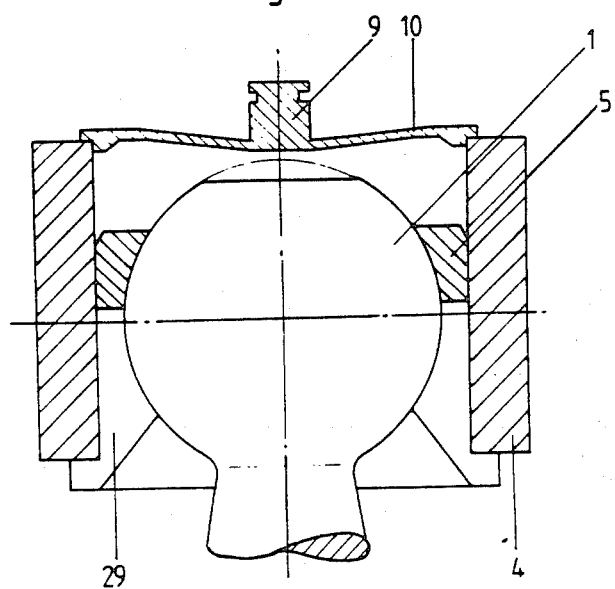
FIG. 4 is a section along line IV—IV of FIG. 1 with the clamping mechanism being in the clamped state.
Figure 7:
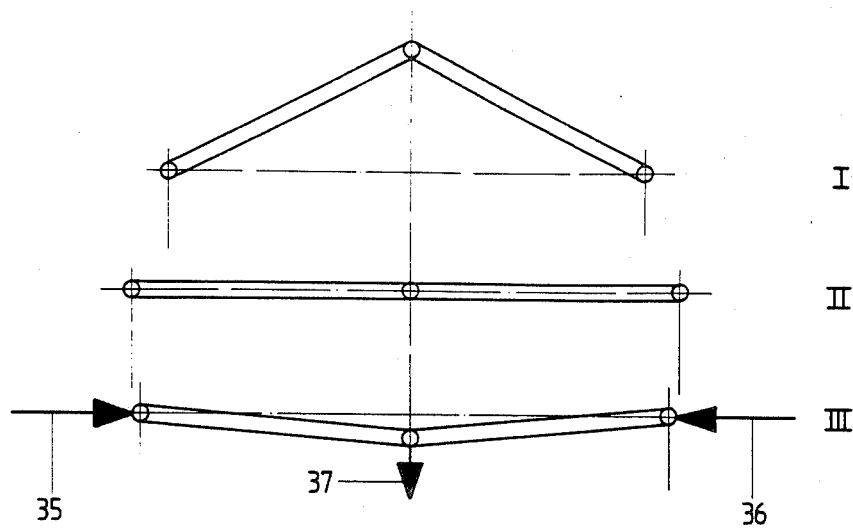
FIG. 7 is a schematic illustration of the knee-lever mechanism of the clamping assembly.
Figure 8:
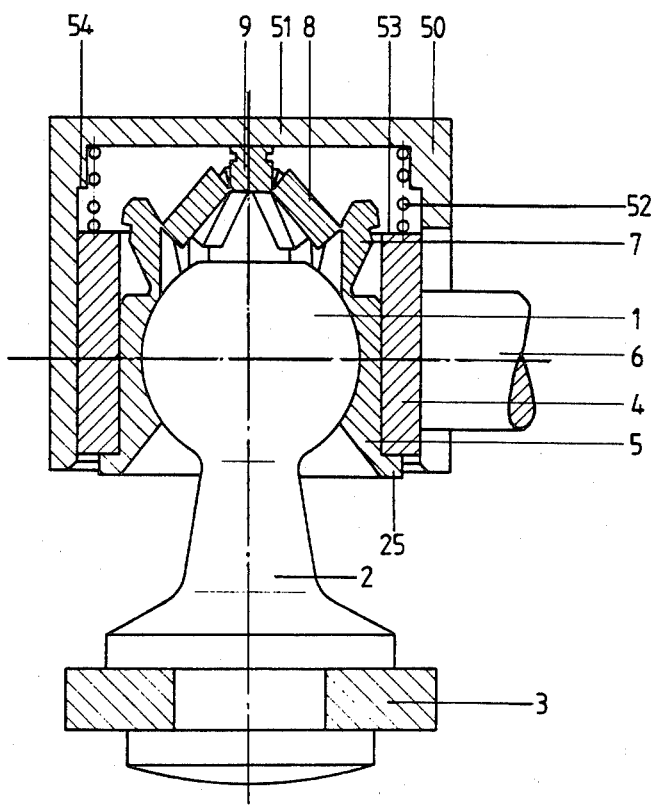
FIG. 8 is a section through the assembly fixture and the ball joint prior to biasing the knee-lever mechanism.
Figure 9:
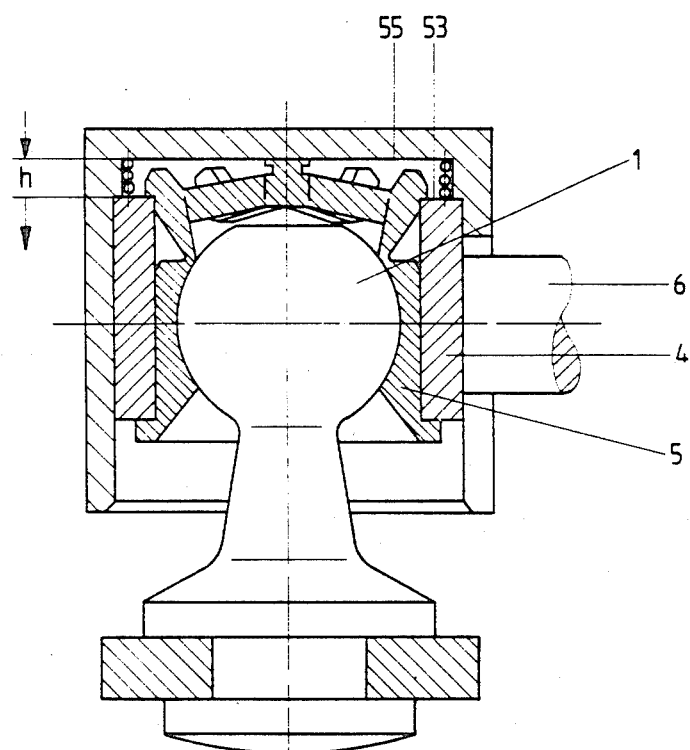
FIG. 9 is the section according to FIG. 8 after biasing the knee-lever mechanism.

The clamping unit or bracing and clamping mechanism is movable from its unclamped position, as shown in FIGS. 2, 6 or 8, toward its clamped position, as shown in FIGS. 3 or 9, by pushing the thrust member 9 (or bearing surfaces 60 in the FIG. 5 embodiment) toward the flat end 19 of the ball stud 1. Movement of the thrust member 9 (or bearing surfaces 60) of the bracing and clamping mechanism toward its clamped position causes the braces 8 to move outwardly, which in turn causes the hook-like members 7 to move outwardly about their hinges 16 and engage the steel ring 4. As this movement occurs, the third pivot axes of the hinges 18 (or 31) move downwardly toward the flat end 19 of the ball stud 1 and the second pivot axes of the hinges 17 move outwardly toward the steel ring 4 until these two pivot axes are aligned, as shown schematically in FIG. 7 and designated by the Roman numeral II. Further movement of the thrust member 9 (or bearing surfaces 60) toward the flat end 19 of the ball stud 1 causes the third pivot axes of the hinges 18 (or 31) to move over center and closer to the flat end 19 than the second pivot axes of the hinges 17 (as shown schematically in FIG. 7 and designated by the Roman numeral III) until the clamped position is reached, as shown in FIG. 4. In this position the self-biasing forces of the integral hinges 17 and 18 (or 31) tending to return themselves to their normal free state position will maintain the hook-like members 7 in engagement with the steel ring 4 and cause the socket 5 to be biased into engagement with the spherical ball 1. It will thus be seen that the clamping unit, integral with the socket 5, functions as an over-center toggle.

The radial forces indicated in FIG. 7 by arrows 35 and 36, the axial force indicated by arrow 37 and the biasing forces indicated in FIG. 3 by arrows 26 and 27 can be adjusted to the desired values by making changes in the spacings 40 to 44 identified in FIG. 6. The biasing force, arrows 26 and 27, will be increased, and the radial forces, arrows 35 and 36, will be reduced as the spacing 44 is reduced, and vice versa. Tuning or changing the spacings 41 and 44 with respect to one another will affect the biasing forces, arrows 26 and 27. Any change in the spacing 43 will affect the spacings 40, 41, 42 and 44. Nevertheless, there must always remain a small axial force, arrow 37, to prevent the mechanism from recoiling.

The assembly procedure of the ball joint is apparent from FIGS. 8 and 9. To start out, the ball 1 is guided in to the socket 5, and the two members, together with the steel ring 4, are inserted into the pot-like housing 5 of the assembly fixture. The coil spring 52 arranged on the bottom 51 of the fixture bears against the steel ring 4 and retains the same in engagement with the lower abutment, collar 25, of the socket 5. When the housing 50 is lowered, bottom 51 will urge the thrust member 9 downwardly until the upper edge 53 of the steel ring 4 engages the projecting portion 54 inside the housing 50, i.e., when the socket is in the biased state. The assembled ball joint is now urged out of the housing 50 of the fixture by the force of the compressed coil spring 52. The spacing h between the inner surface 55 of the bottom and the upper edge 53 of the steel ring 4 can be adjusted to the exact requirements of the clamping mechanism. The edges 57 and 58 (FIG. 2) of the braces 8, of which there are preferable six in number, are bearing against the hook-like members 7 and the thrust member 9 when the ball joint is in the assembled state, as is apparent from FIG. 3. This also holds true for the embodiment according to FIG. 5. In the embodiment according to FIG. 5, the function of the thrust member 9 is assumed by the surfaces 60 which, in the biased state, are bearing against one another. It should be appreciated that the surfaces 60 and 61 are only laterally in engagement with one another, similar to the arrangement illustrated in FIG. 1 but without the thrust member 9 illustrated therein.

The invention has been described by way of two exemplary embodiments. However, it should be appreciated that the scope of the invention is not limited by the two examples, but that a variety of modifications may be utilized in terms of arrangement and configuration of the individual components of the clamping unit according to the invention, without departing from the basic concept of the invention.

The embodiments of the invention in which an exclusive property or privilege is claimed are defined as follows:

1. A ball joint, especially for motor vehicles, comprising a spherical ball having a shank, a socket having an opening on one side and axially extending slots for receiving and engaging said spherical ball, a housing comprising a metal ring surrounding said socket and having one end engaging an abutment means carried by said socket adjacent said one side thereof, and a bracing and clamping mechanism formed integral with said socket and adjacent said spherical ball at its end remote from its shank for retaining said socket within said steel ring and preventing relative axial displacement relative thereto, the improvement being that said bracing and clamping mechanism includes a plurality of annularly spaced hook-like members integrally hinged at one end to said socket via first hinges, a plurality of bracing members being integrally hinged at their outer ends with the other ends of adjacently located ones of said hook-like members via second hinges and a thrust member integrally hinged with the inner ends of said bracing members via third hinges, said bracing and clamping mechanism being movable between an unclamped position in which said third hinges have their pivot axes spaced further from said spherical ball than the axes of said second hinges and said hook-like members are disengaged from said metal ring at its other end to permit disassembly of said ball joint and a clamped position in which said hook-like members engage said other end of said steel ring and said third hinges have their axes located closer to said spherical ball than the axes of said second hinges by pushing said thurst member of said bracing and clamping mechanism toward said spherical ball whereby said bracing and clamping mechanism functions as an over-center toggle mechanism to retain said socket in place on the metal ring and to biasingly hold said socket in engagement with said spherical ball.

2. A ball joint, especially for motor vehicles, comprising a spherical ball having a shank, a socket having an opening on one side and axially extending slots for receiving and engaging said spherical ball, a housing comprising a metal ring surrounding said socket and having one end engaging an abutment means carried by said socket adjacent said one side thereof, and a bracing and clamping mechanism formed integral with said socket and adjacent said spherical ball at its end remote from its shank for retaining said socket within said steel ring and preventing relative axial displacement relative thereto, the improvement being that said bracing and clamping mechanism includes a plurality of annularly spaced hook-like members integrally hinged at one end to said socket via first hinges, a plurality of bracing members being integrally hinged at their outer ends with the other ends of adjacently located ones of said hook-like members via second hinges and being integrally hinged adjacent their inner ends with each other via third hinges, said bracing and clamping mechanism being movable between an unclamped position in which said third hinges have their pivot axes spaced further from said spherical ball than the axes of said second hinges and said hook-like members are disengaged from said metal ring to permit disassembly of said ball joint and a clamped position on which said hook-like members engage said steel ring at its other end and said third hinges have thier axes located closer to said spherical ball than the axes of said second hinges by pushing said bracing and clamping mechanism adjacent said third hinges toward said spherical ball whereby said bracing and clamping mechanism functions as an over-center toggle mechanism to retain said socket in place on the metal ring and to biasingly hold said socket in engagement with said spherical ball.

3. A ball joint, especially for motor vehicles, comprising a spherical ball having a shank, a socket having an opening on one side and axially extending slots for receiving and engaging said spherical ball, a housing comprising a metal ring surrounding said socket and having one end engaging an abutment means carried by said socket adjacent said one side thereof, and a bracing and clamping mechanism formed integral with said socket and adjacent said spherical ball at its end remote from its shank for retaining said socket within said steel ring and preventing relative axial displacement relative thereto, the improvement being that said bracing and clamping mechanism includes a plurality of annularly spaced hook-like members integrally hinged at one end to said socket via first hinges, a plurality of bracing members being integrally hinged at their outer ends with the other ends of adjacently located ones of said hook-like members via second hinges and being integrally hinged adjacent their inner ends with each other via third hinges, said bracing members having axially extending protrusions defining bearing surfaces adjacent said third hinges, said bracing and clamping mechanism being movable between an unclamped position in which said third hinges have their pivot axes spaced further from said spherical ball than the axes of said second hinges and said hook-like members are disengaged from said metal ring to permit disassembly of said ball joint and a clamped position on which said hook-like members engage said steel ring at its other end and said third hinges have their axes located closer to said spherical ball than the axes of said second hinges by pushing said bearing surfaces on said protrusions on said bracing members of said bracing and clamping mechanism toward said spherical ball whereby said bracing and clamping mechanism functions as an over-center toggle mechanism to retain said socket in place on the metal ring and to biasingly hold said socket in engagement with said spherical ball.

4. A ball joint as defined in claims 1, 2, or 3, and wherein said bracing and clamping mechanism includes a thin covering membrane which is formed integral with said hook-like members and said bracing members to protect the ball joint against dirt and moisture.

5. A ball joint as defined in claims 1, 2 or 3 and wherein said socket and bracing and clamping mechanism are integrally formed from a plastic material.

6. A ball joint as defined in claim 1, and wherein said bracing and clamping mechanism includes a thin covering membrane which is formed integral with said hook-like members and said bracing members to protect the ball joint against dirt and moisture and wherein said socket and bracing and clamping mechanism including the covering membrane are integrally formed from an injection molded plastic material.

* * * * *